United States Patent Office.

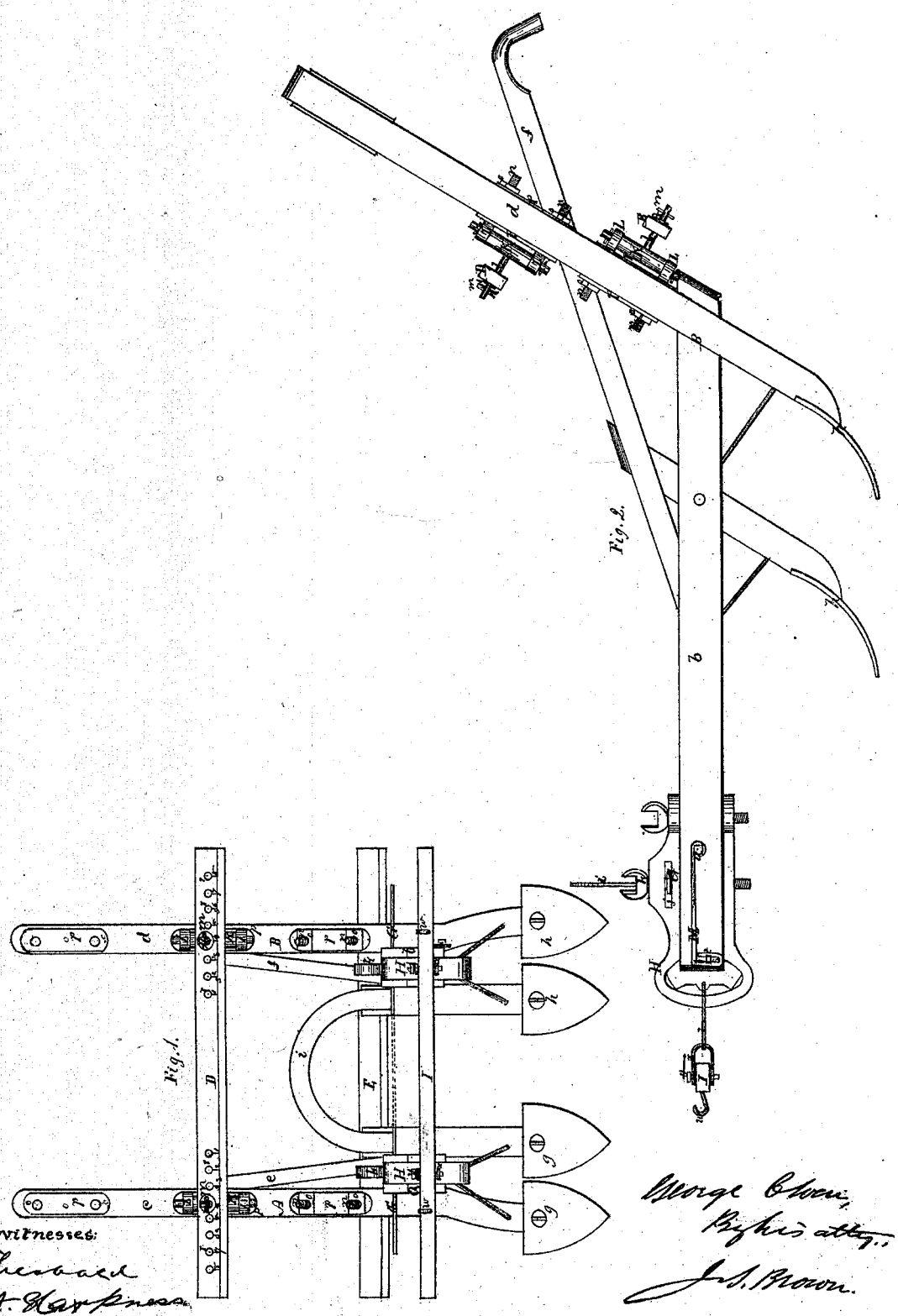

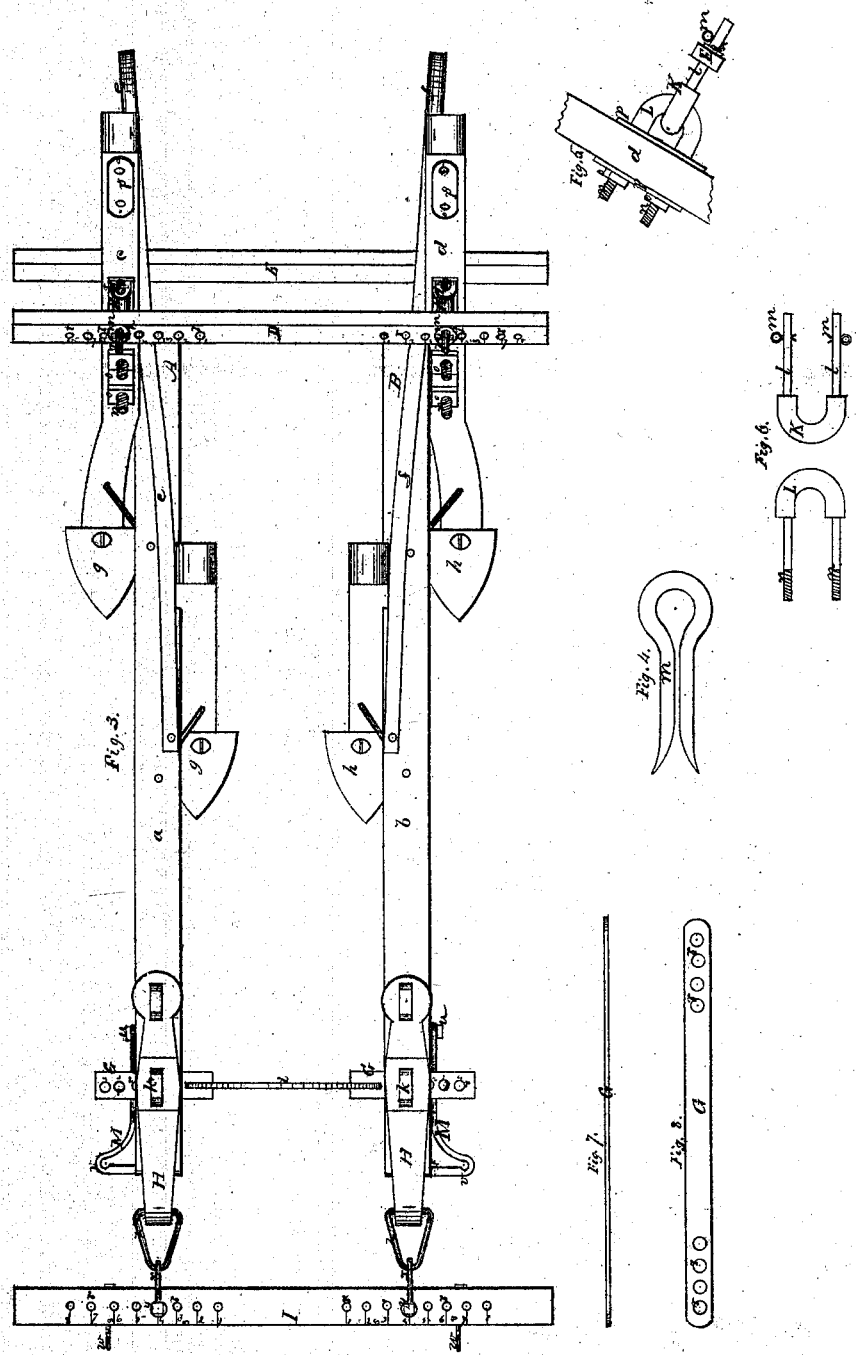

GEORGE OWEN, OF JACKSONVILLE, ILLINOIS.

Letters Patent No. 112,273, dated February 28, 1871.

IMPROVEMENT IN COUPLINGS FOR PLOWS.

The Schedule referred to in these Letters Patent and making part of the same.

*To all whom it may concern:*

Be it known that I, GEORGE OWEN, of Jacksonville, in the county of Morgan and State of Illinois, have invented new and useful Improvements in Couplings for Double-Plows and Cultivators; and I do hereby declare that the following is a full and exact description thereof, reference being had to the accompanying drawing making part of this specification—

Figure 1 being a front view of double cultivators provided with my improved couplings;

Figure 2, a side view of the same;

Figure 3, a top view thereof;

Figure 4, a view of a part detached;

Figures 5 and 6, views of modified parts;

Figures 7 and 8, views of another modified part.

Like letters designate corresponding parts in all of the figures.

My improvements are represented as applicable to two cultivators A B; but they are equally applicable to two plows coupled together. The general plan of coupling is similar to the rigid double-plow coupling with loose joints, patented by me on the 4th day of February, 1862, and reissued a second time on the 2d day of November, 1869.

The parts, as represented, comprising the stocks of two cultivators or plows are, the beams $a\ b$, standards $c\ d$, and handles $e\ f$.

To each stock are attached two cultivator-teeth $g\ g$ and $h\ h$, respectively. The shovel-teeth shown may be replaced by others which turn the ground to one side, either right or left, those of the two cultivators, respectively, toward or from each other. Or these cultivator-teeth may be replaced by single or double points, shares, land-sides, and mold-boards, forming regular plows. Or more than two cultivator-teeth may be used on each stock; and any form or arrangement thereof may be adopted.

Two rigid coupling-bars D E, of wood or metal, are secured to the standards $c\ d$ of the two cultivators; and one coupling-bar G is secured to the beams $a\ b$, near the front ends thereof. They are all, if made of single pieces, of sufficient length to enable the two cultivators to be separated as far as may ever be required.

The front coupling-bar G is represented in the main figures as having an upward arch or bend, $i$, in the middle, to pass over growing corn or other plants, when they have grown too high for straight couplings to pass over; but a straight bar is indicated by dotted lines in fig. 1, and shown separately in figs. 7 and 8. The lower rear coupling-bar E, also may have such an upward arch or bend.

My first improvement consists in the improved joint which connects the rear coupling-bars D and E with the standards $c\ d$, so as to secure perfect freedom of motion to the cultivators, either laterally, up and down, or forward and backward; while one cultivator regulates the position and movements of its fellow thereby, so that the attendant, with one handle, $e$ or $f$, for each cultivator, can guide both with as much ease and certainty as he can a single cultivator or plow.

The joint is composed of a short roller, K, with a round stem, $l$, projecting at right angles from the middle thereof, to pass through the coupling-bar, and of two eye-bolts L L, to receive the journals of the roller, secured to the standard of the cultivator by a screw-shank, $n$, passing through the same, and fastened by a nut, $o$.

The roller K is located in a position transverse to the coupling-bar, and turns freely in its eye bearings L L, while its stem $l$ turns freely in the coupling-bar. Thus is obtained a joint of strength amply sufficient for the purpose, and yet allowing a free movement in every direction to the coupling-bar on the standard; and in order to allow sufficient lateral play to the coupling-bar, so as not to be obstructed in its motions by the standards, the stem $l$ of each roller is long enough to permit the coupling-bar to play laterally thereon, as indicated.

The coupling-bar is held on the roller-stem by a forked spring-pin, $m$, shaped as shown particularly in fig. 4, so that the two legs thereof may be pressed together for inserting it through the hole of the stem, and then, by springing apart, they hold the pin securely in place, against any liability to be lost out, to which it would be subject unless thus guarded against by this construction.

Suitable metallic washer plates $p\ p$, may be placed between the shoulders of the eyes L L and the standard and a washer, $q$, between the coupling-bar and the fastening pins $m\ m$, on the stems $l\ l$, of the rollers K K, to prevent wear and abrasion.

As represented, the upper coupling-bar D is placed in front of, and the lower coupling-bar E behind, the standards $c\ d$. This arrangement, though preferable as allowing the freest movement of parts, is not absolutely necessary, as both may be placed before or behind the standards.

The stems $l\ l$, of the joint-rollers K K, are inserted through either one of two sets of holes $r\ r$, in each coupling-bar, at different distances from the ends thereof, according to the distances apart of which the cultivator-stocks are to be placed. The corresponding holes of both sets in the same coupling-bar are at equal distances from the middle of the bar; and these holes may be marked by scales, and numbered correspondingly, as represented at $s\ s$, fig. 1, for convenience in changing the distances.

In figs. 5 and 6 is shown a modification of the coupling-joint, as above described. Two staples K L are linked together, as shown in fig. 5, to form the universal joint. The staples are formed respectively as shown in fig. 6. The two stems $l\,l$ of the staple K, pass loosely through the coupling-bar, which has lateral play thereon, and is held by spring-pins $m\,m$, as above described; and the staple L has screw-shanks $n\,n$, to pass through the standard, and to be held by nuts $o\,o$, as in the foregoing plan.

The forward coupling-bar G, for the front ends of the beams $a\,b$, is arranged in a somewhat different manner from that of the rear coupling-bars D E, above described, to adapt it to its position.

With this bar the coupling-joints are formed by means of the clevises H H, of the beams, there being in the upper leg of each clevis a transverse horizontal slot, $j$, through which the ends of the coupling-bars project, and turn horizontally therein on vertical pivots or bolts $k\,k$, inserted in vertical holes of the clevises, as shown. Each slot is made considerably longer than the width of the coupling-bar, and wider than the thickness thereof, so as to allow a perfectly free play or movement to the coupling-bar in every direction therein.

There are sets of adjusting holes $r\,r$ in each end of this coupling-bar, through which the pivots $k\,k$ pass; and these holes may have scale divisions, and numbered in the same manner as the adjusting holes in the rear coupling-bars, and corresponding therewith in distance and number.

The ends of the coupling-bar are widened longitudinally where they pass through the slots of the clevises, in order to hold it firmly in an upright position; while its middle arched or bent portion $i$ is widened vertically to give it strength.

A single draft-bar, I, is connected with the clevises H H of the cultivators by swivel links $x\,x$ and bolts $y\,y$ passing through them and the draft-bar, and by additional connecting links $z\,z$.

The bolts $y\,y$ pass through different holes of the draft-bar, with numbered scale divisions, as and corresponding with those of the coupling-bars.

When the two cultivators or plows are brought close or near to each other, as is sometimes desirable, the draft-bar I becomes inconvenient to use and is dispensed with, and, instead, two side clevises M M, of peculiar construction, are attached to the outer sides of the beams $a\,b$, respectively, substantially as shown.

These clevises are pivoted at their rear ends on bolts or pins $u\,u$, so that the front ends may be adjusted up and down to vary the depth of the draft. They are adjusted by means of a vertical slot, $s$, (fig. 2) in each, and a tightening screw, $t$.

The draft-chain or the whiffletree is hooked into an eye, $v$, in each clevis.

The double cultivators or plows thus coupled may be mounted with wheels, if desired, and the advantages thereof will be retained.

What I claim as my invention, and desire to secure by Letters Patent, is—

1. The improved coupling-joint, composed of the roller K, with its stem $l$ and key $m$, and the eyes L L, all constructed and arranged substantially as and for the purpose herein specified.

2. The double cultivators or plows, provided with the coupling-bars D and E, jointed thereto by the couplings K L L, with the coupling-bar G, jointed thereto by the slotted clevises H H, and pins or bolts $k\,k$, and with the side clevises M M, all constructed and arranged substantially as and for the purpose herein specified.

Specification signed by me February 9, 1870.

GEORGE OWEN.

Witnesses:
CALEB LETTON,
GEORGE VANZANT.